No. 882,215. PATENTED MAR. 17, 1908.
W. S. STAPLEY.
TIRE PUMP.
APPLICATION FILED OCT. 27, 1905.

WITNESSES
H. A. Lamb
S. W. Atherton

INVENTOR
William S. Stapley
BY
A. M. Wooster
ATTORNEY

THE NORRIS PETERS CO., WASHINGTON, D. C.

UNITED STATES PATENT OFFICE.

WILLIAM S. STAPLEY, OF BRIDGEPORT, CONNECTICUT, ASSIGNOR TO THE BRIDGEPORT BRASS COMPANY, OF BRIDGEPORT, CONNECTICUT, A CORPORATION OF CONNECTICUT.

TIRE-PUMP.

No. 882,215.  Specification of Letters Patent.  Patented March 17, 1908.

Application filed October 27, 1905. Serial No. 284,657.

*To all whom it may concern:*

Be it known that I, WILLIAM S. STAPLEY, a citizen of the United States, residing at Bridgeport, county of Fairfield, State of Connecticut, have invented a new and useful Tire-Pump, of which the following is a specification.

This invention has for its object to provide a simple, durable, compact and very powerful double-acting tire pump which shall be adapted for general use as for inflating the tires of bicycles, buggies, &c., and especially adapted for inflating the heavy tires of motor vehicles, and my invention consists in certain constructions and in certain parts improvements and combinations which will be hereinafter described and then specifically pointed out in the claims hereunto appended.

Figure 2:
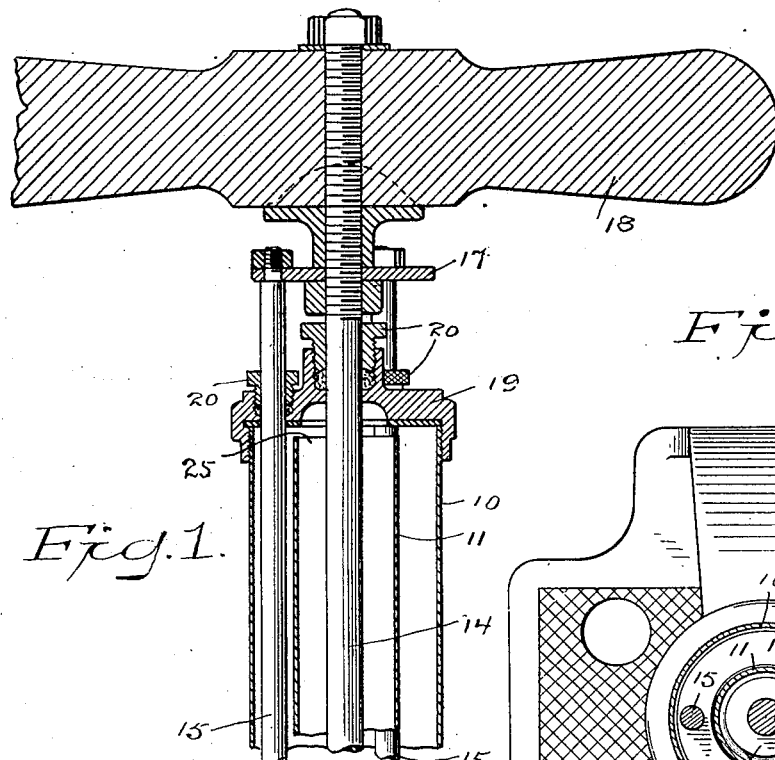
Figure 1:
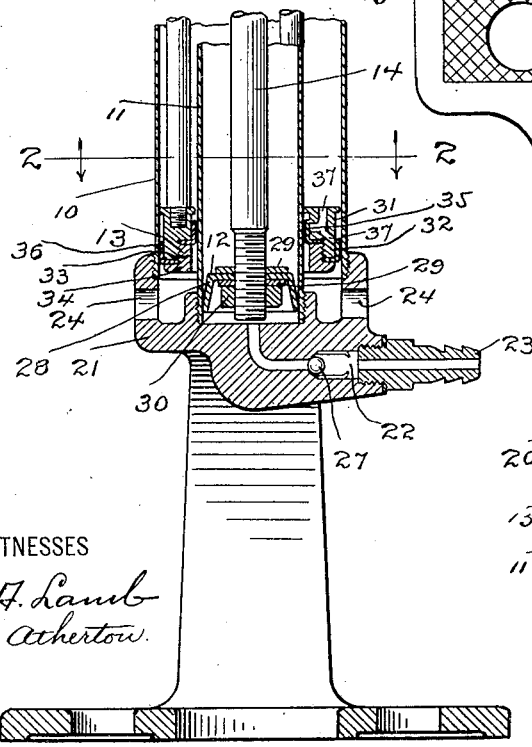

In the accompanying drawing forming a part of this specification, Figure 1 is a vertical section of my novel pump complete; Fig. 2 a horizontal section on the line 2—2 in Fig. 1, looking down; and Fig. 3 is a detail sectional view illustrating a slightly variant form.

My novel pump consists essentially of an outer tube 10 and an inner tube 11 placed concentrically, an inner piston 12 in the inner tube and a ring-shaped outer piston 13 in the outer tube and surrounding the inner tube. These pistons move together but operate alternately. The inner piston is carried by an inner piston rod 14 and the outer piston is carried by a plurality of outer piston rods 15 which reciprocate in the outer tube. In the present instance, three outer piston rods are shown, the upper ends of which are connected to a plate 17 which in turn is connected to the inner piston rod, the latter being shown as provided with a handle 18 for convenience in operation. At the upper end of the outer tube is a cap 19 having stuffing boxes 20 through which the piston rods pass. The lower end of both tubes is connected to a base 21 which may be of any ordinary or preferred form. In the present instance, I have illustrated a stirrup base, so called, although a T-base or any ordinary or preferred form of base may be used in lieu thereof.

Air passes from the pump through an outgoing passage 22 which opens inwardly into the inner tube only and opens externally into a nozzle 23. Air enters the pump through openings 24 which communicate with the outer tube only. The outer tube communicates with the inner tube at the top.

Figure 3:
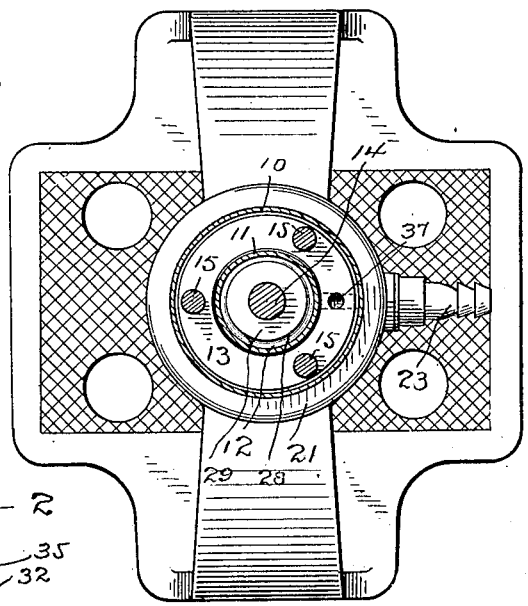

In Fig. 1, I have shown the inner tube as wholly disconnected from the cap and with a passage 25 between the upper end thereof and the cap, and in Fig. 3 I have illustrated a slightly variant form in which the upper end of the inner tube is connected to the cap and is provided with openings 26 through which air passes to the inner tube from the outer tube.

The pistons may be of any ordinary or preferred construction, it being of course required that on the operative stroke they carry the air before them and on the inoperative stroke they collapse and allow air to pass. The inner piston, as shown in the drawing, consists simply of a cup-shaped flexible washer 28 which collapses so as to permit air to pass when the piston is moved upward and engages the wall of the inner tube carrying air before it when the piston is moved downward. This washer is held between plates 29 and is secured to piston rod 14 by a nut 30. The outer piston is provided with flexible washers which face respectively inward and outward. I preferably use a piston consisting of an upper ring 31 which is engaged by piston rods 15 and is provided with an internally threaded flange 32 which is engaged by an externally threaded flange 33 on a lower ring 34.

35 denotes a flexible ring-shaped washer which engages the outer wall of the inner tube and whose lower edge is turned inward and is clamped between the upper end of the lower ring and the shoulder at the base of the flange upon the upper ring.

36 denotes a flexible ring-shaped washer which is adapted to engage the inner wall of the outer tube and whose lower end is turned inward and is clamped between the lower end of the upper ring and the shoulder at the base of the flange upon the upper ring.

The upper ring is shown as provided with air passages 37, one only being shown, which lead from the upper end of the ring and open against the inner sides of the washers, so that when the piston is moved downward both washers will collapse against the piston and will permit air to pass freely, and when the piston is moved upward said washers will expand and engage the outer wall of the inner tube and the inner wall of the outer tube respectively and carry air before the piston.

Opening 22 in the base is provided with a suitable valve 27, in the present instance a ball valve, which prevents back pressure of air into the inner tube under any conditions.

The operation is as follows: The upward movement of the pistons is the operative stroke of the outer piston and the inoperative stroke of the inner piston, and the downward movement is the operative stroke of the inner piston and the inoperative stroke of the outer piston. Starting with the parts in the position shown in Fig. 1, as the outer piston moves upward, the air in front of it will be forced through passage 25 into the inner tube, past the inner piston and out through passage 22. During the downward stroke of the pistons, the air before the inner piston will be forced out through passage 22 and air will enter chamber 16 through openings 24 and will pass the outer piston to fill the vacuum behind it, so that whether the inner piston is moving upward or downward, air will be forced outward from the inner tube through passage 22; the outward movement of the air being caused during the upward movement by the outer piston and during the downward movement by the inner piston.

I do not claim herein the subject-matter of claims 3 and 4 of my Patent No. 855,026, May 28th, 1907.

Having thus described my invenion I claim:

1. In a pump, the combination with inner and outer tubes concentrically placed and a base having an eduction passage leading from the inner tube, of an inner rod and piston provided with a flexible washer whereby the piston is made operative during the downward stroke and air is permitted to pass during the upward stroke, and a plurality of rods and a piston in the outer tube, said piston consisting of rings threaded to engage each other and flexible washers clamped between said rings and engaging the inner and outer tubes respectively whereby said piston is made operative during the upward stroke and air is permitted to pass during the downward stroke, all of the piston rods being connected to move in unison.

2. A pump consisting of inner and outer tubes concentrically placed and opening into each other at one end, a rod and piston in the inner tube and a plurality of rods and a piston in the outer tube, said piston consisting of rings threaded to engage each other and flexible washers clamped between said rings and engaging the inner wall of the outer tube and the outer wall of the inner tube respectively, one of said rings being provided with air passages leading against the inner sides of the washers so that when the piston is moved in one direction the washers will collapse and permit air to pass, and when the piston is moved in the opposite direction the washers will engage the walls of the tubes respectively and carry air before it, all of the piston rods being connected to move in unison.

In testimony whereof I affix my signature, in presence of two witnesses.

WILLIAM S. STAPLEY.

Witnesses:
   A. M. WOOSTER,
   S. W. ATHERTON.